United States Patent Office 3,446,727
Patented May 27, 1969

3,446,727
CATALYST FOR CONVERSION OF HYDROCARBONS, METHOD FOR PRODUCING SAID CATALYST, AND HYDROCARBON CONVERSION PROCESSES
Robert B. Secor, Whittier, Calif., assignor to Filtrol Corporation, Los Angeles, Calif., a corporation of Delaware
No Drawing. Continuation-in-part of application Ser. No. 427,144, Jan. 21, 1965. This application June 23, 1967, Ser. No. 648,246
Int. Cl. C10g 11/04; B01j 11/48
U.S. Cl. 208—120                    58 Claims

ABSTRACT OF THE DISCLOSURE

This invention relates to a silicated clay produced by reacting an acid-treated clay, at an elevated temperature, with a solution containing sodium hydroxide and sodium silicate to cause a decrease in the $Al_2O_3$ to $SiO_2$ ratio of the acid-treated clay, and to the use of the silicated clay, preferably after base exchanging the silicated clay with promoting cations, as a promoter for an aluminated acid-treated clay catalyst. The invention also includes the use of such a catalyst in hydrocarbon conversion process.

---

This application is a continuation-in-part of application Ser. No. 427,144, filed Jan. 21, 1965, now abandoned.

This invention relates to and has for its object an improved natural clay catalyst. It also relates to and has for its object the treatment of natural clays to improve catalytic properties.

It also relates to and has for its object methods for cracking, hydrocracking, isomerization, hydroforming, reforming, polymerization, oxidation, dehydrogenation, hydrogenation, desulfurization, alkylation, aromatization or other conversion of organic compounds such as hydrocarbons, for example, crude petroleum oils and fractions thereof and of their conversion products, using the above catalysts.

It has long been known that clays such as the montmorillonite and kaolin clays may be improved in their catalytic activity by purifying them by treatment with acid, such as sulfuric acid-water solutions. This type of clay has been sold by the assignee of this application for many years under its trademark Filtrol. For purposes of nomenclature in this application, I shall refer to the above procedure as sulfuric acid treatment and to such clays as sulfuric acid treated clays.

Such clays may also be improved in their catalytic activity by treating them with water solutions of sodium hydroxide or solutions of sodium ions in solutions of high pH containing some silicate ions. This procedure is herein referred to as silicating of the clay, and the clays thus produced are referred to as silicated clays.

The silicating process results in an increase in the $SiO_2/Al_2O_3$ ratio of the clay. While I do not wish to be bound by any theory of the way the silicating process occurs, I believe that it occurs through the influence of the silicate ions.

It has been shown that sulfuric acid treated clays may be further improved as cracking catalysts by adding aluminum hydrate to the sulfuric acid treated clays. The degree of improvement depends on the nature of the aluminum hydrate as well as on the amount thereof. Reference is made to the Ewing Patent 2,410,436 and to my Patent 2,935,463 for the nature of the clays, the method of treatment, and the desirable ratios of the aluminum hydrate to the treated clay.

The clays which are subjected to the treatment in the process of my invention are referred to in the above patents, to which reference is made for further description of the clays, relating to the sulfuric acid treatment of the clays and relating to the addition of the aluminum hydrate. The sulfuric acid-treated clays to which the aluminum hydrate has been added are herein referred to as aluminated sulfuric acid treated clays.

I have made the following additional discoveries which have resulted in improved clay catalysts, an improved method of production of clay catalysts, and improved hydrocarbon conversion processes.

I have found that the further treatment of the aluminated sulfuric acid treated clays, by the addition to them of silicated sulfuric acid-treated clays, markedly improves the catalytic activity of the aluminated sulfuric acid treated clay. Such sulfuric acid treated clays are preferably treated at relatively high temperatures with sodium hydroxide and sodium silicate solutions and combined with the aluminated clay. Such a combined catalyst, particularly after certain cations have been base exchanged onto the clays, produces an excellent cracking catalyst.

The clay catalyst of my invention in one embodiment is a three-component material formed of a sulfuric acid-treated clay designated as Component A; hydrated alumina as a second component; and a silicated acid-treated clay, designated as Component B.

The order of mixing of the three components is not significant. Thus, the hydrated alumina may be incorporated into the sulfuric acid-treated clays, as described in my aforesaid patent, before mixing with the silicated clays. Alternatively, the hydrated alumina may be added to the silicated clay employing the techniques described in my aforesaid patent and then mixed with the sulfuric acid-treated clays. Alternatively, all three components may be mixed together by the aforesaid techniques. There is little difference in catalytic activity, when measured according to the criteria hereinafter described.

Catalytic promoters, in addition to said hydrated alumina, may also be used. These promoters may be incorporated as salts or hydrates, or the promoting cations may be incorporated into the catalysts by base exchange of the salts of the promoting cation with the sulfuric acid-treated or silicated clays or the mixtures thereof.

Depending on the hydrocarbon conversion process in which the clay catalyst is to be used, I may incorporate into the catalyst as catalyst promoters one or more than one of the following cations: nickel, silver, palladium, platinum, copper, manganese, cobalt, iron, zinc, titanium, aluminum, calcium, magnesium, tungsten, molybdenum, thorium, or the rare earth cations such as cerium, lanthanum, neodymium and praseodymium.

These cations may be incorporated into the sulfuric acid-treated clay, or the silicated clay, or into mixtures thereof, or mixtures of one or both of them with hydrated alumina, by base exchange. All of the above cations may be used separately or in combinations, in any or all proportions.

In high temperature conversion processes of relatively high boiling hydrocarbons, such as petroleum oil or fractions thereof, that are liquid at ordinary temperatures, I prefer to avoid base exchanging cations that may promote the formation of excessive amounts of carbon and/or light gases.

I prefer to use as the hydrated alumina the hydrate formed by reaction between an ammonium alum and $NH_4OH$ in aqueous solutions of pH in excess of 10. This kind of hydrated alumina and its method of production are fully described in my Patent 2,935,463, which is herein incorporated by this reference as if fully set forth at this place. Particularly, I employ the procedure set forth under Example 1 of the aforesaid patent.

The method used in the sulfuric acid treatment of the clay is described in the Ewing Patent 2,410,436 and in my Patent 2,935,463, both of which are incorporated herein by this reference.

I have found it desirable to use the sulfuric acid treated clay as the starting material in the preparation of the silicated clay.

The sulfuric acid-treated clay or calcined sulfuric acid-treated clay is dispersed in an aqueous sodium hydroxide solution. The dispersion of the clay in this solution is maintained for a period of time. The time and temperature are correlated to give the degree of treatment desired.

A suitable range of composition of the solution is one containing Na expressed as $Na_2O$ and Si expressed as $SiO_2$ in the following molar ratio range: $0.75\ Na_2O:1.0\ SiO_2$ to $7.5\ Na_2O:1.0\ SiO_2$.

The concentration of the Na in the solution expressed as $Na_2O$ may be in the following range: about 4% by weight to about 20% by weight.

When employing the crystalline, i.e., uncalcined acid-treated halloysite, the composition of the solution is one containing Na expressed as $Na_2O$ and Si expressed as $SiO_2$ in the following molar ratio range: $3.5\ Na_2O:1.0\ SiO_2$ to $7.5\ Na_2O:1.0\ SiO_2$.

The concentration of the Na in the solution expressed as $Na_2O$ may be in the following range: about 4% by weight to about 8% by weight. The weight of the uncalcined acid-treated clay per hundred parts by weight of the solution is in the range of about 4 to about 11 parts by weight.

When employing calcined acid-treated clay, calcined to destroy substantially all of the crystalline clay, the composition of the solution is one containing Na expressed as $Na_2O$ and Si expressed as $SiO_2$ in the following molar ratio range: $0.75\ Na_2O:1.0\ SiO_2$ to $1.5\ Na_2O:1.0\ SiO_2$.

The concentration of the Na expressed as $Na_2O$ may be in the following range: about 8% by weight to about 20% by weight. The weight of calcined acid-treated clay per hundred parts by weight of the solution is in the range of about 5 to about 12 parts by weight.

During a period in the course of the clay treatment, I use elevated temperatures within the range of about 150° F. to boiling temperature.

Preferably I employ a low temperature digestion of the acid-treated clay in the sodium hydroxide-sodium silicate solution in order to peptize the clay. The clay is deflocculated and dispersed as a finely divided dispersion of clay crystalloids. Where I employ the calcined acid-treated clay, the result is a finely divided solid dispersion of the calcined clay particles.

This digestion is carried out suitably at a temperature of about 60° F. to about 90° F. for a period of about 15 hours to about 200 hours. This digestion is followed by a digestion at elevated temperature of about 150° F. to about 210° F. for a period of about 10 hours to about 60 hours.

Where I employ the uncalcined acid-treated clay, the low temperature digestion is preferably in the range of about 70° F. to about 90° F. for about 15 hours to about 30 hours, followed by a digestion at an elevated temperature of about 150° F. to the boiling point for about 15 hours to about 50 hours.

Where I employ the calcined acid-treated clay, the low temperature digestion is preferably in the range of about 65° F. to about 85° F. for about 50 hours to about 200 hours, followed by a digestion at an elevated temperature of about 175° F. to about 210° F. for about 15 hours to about 50 hours.

For uncalcined acid-treated clay, the above treatment results in a silicated clay containing about 10% to about 90% by weight of unconverted acid-treated clay, producing a silicated clay product containing about 90% to about 10% by weight silicated acid-treated clay; the resultant mixed clay having an $Al_2O_3$ to $SiO_2$ ratio in the range of about 1:2.4 to about 1:2.8.

For calcined acid-treated clay, the above treatment results in a silicated clay product containing about 10% to about 75% of the unconverted calcined acid-treated clay, containing 90% to 25% of the silicated acid-treated clay; the resultant mixed clay having an $Al_2O_3$ to $SiO_2$ ratio in the range of about 1:3 to about 1:4.5. For example, when using the acid-treated clay, the degree of treatment desired is such that the resultant silicated clay shall have approximately the $Al_2O_3:SiO_2$ ratio of 1 mol of $Al_2O_3$ to about 2.2 and up to about 6 mols of $SiO_2$.

In my preferred treatment, the silicated clay is combined with the sulfuric acid treated clays and the hydrated alumina in one of the orders referred to above.

To prepare the catalyst, I treat the silicated clays with salts of the aforementioned cations prior to mixing with the sulfuric acid-treated clays and the hydrated alumina.

I have found it desirable that the sulfate content of this clay catalyst shall not exceed about 2% $SO_3$. The $SO_3$ content of the catalyst may vary from about .5% to 2%, and it can be reduced as desired by washing.

I prefer to use the kaolin clays in producing the catalytic clays employed in my invention. A preferred kaolin clay is halloysite. This clay, when mined, may contain, in addition to halloysite (which has a composition of $Al_2O_3:2SiO_2:2H_2O$ or $Al_2O_3:2SiO_2:4H_2O$), kaolinite, which has the same composition as halloysite, and the mineral alunite.

A typical analysis of this clay, in percent by weight on a volatile free basis, is given under Example 2 of the aforesaid Patent 2,935,463, as follows by weight: $Fe_2O_3$—0.63%; $Al_2O_3$—49.3%; $SiO_2$—51.3%. There are also present other metal oxides in small and/or trace amounts.

This clay is sulfuric acid treated in the manner described in my above patent, and is washed to reduce its sulfate content as desired.

A typical analysis of an acid-treated clay is as follows by weight: $SiO_2$ (57.4%); $Al_2O_3$ (40.3%); $Fe_2O_3$ (0.4%); remaining oxides including other minor amounts of metal oxides. Of the acid-treated clay, about 5 to about 11 weight percent is silica which is soluble in dilute sodium carbonate solution. The basic $Al_2O_3:SiO_2$ ratio of the clay is equal to about 1:2. The soluble silica resulting from the acid treatment raises the ratio from about 1:2 up to a ratio in the range of about 1:2.2 to about 1:2.6. The soluble silica is leached by caustic solution.

Use of the caustic soda and silicate in suitable amounts, time and temperature, will adjust the $Al_2O_3:SiO_2$ ratio of the sulfuric acid-treated clay to the range of about 1:2.2 to about 1:6. Sodium silicate is preferably added to the caustic soda to form a caustic soda-sodium silicate solution. Sodium silicate may be used in sufficient quantity to adjust the $Al_2O_3:SiO_2$ ratio of the silicated clay to within the above range. Where uncalcined acid-treated clay is silicated in the process of my invention, the adjustment of the ratio results from a conversion of a portion of the kaolin into a structure having an $SiO_2:Al_2O_3$ ratio higher than the value of 2 typical of the kaolin structure.

The silicated clay is mixed with the sulfuric acid-treated clay and aluminum hydrate, as stated above, in the sequence referred to above. The mixing occurs in a water dispersion of the clays.

The hydrated alumina may be either of the kind referred to in the Ewing patent or in my patent. I prefer to use the hydrated alumina as prepared in my patent.

The ratios of the hydrated alumina are adjusted to obtain superior catalytic activity and stability. My Patent 2,935,463 is referred to for suitable ratios. The hydrated alumina may be added in the ratio of about 100 parts by weight of sulfuric acid treated clay (volatile free basis) to an amount of hydrated alumina equivalent to about 10 to about 40 parts by weight of $Al_2O_3$. About 12 to about 35 parts is a suitable and more economical range.

Prior to mixing the silicated clay with the other components of the catalyst, I prefer to base exchange cations by adding the desired reagent or reagents to a water dispersion of the silicated clay. Such reagents may be the sulfates or other salts of the rare earths. I may use mixtures of the cerium, lanthanum and neodymium sulfates or chlorides. There may also be present a small amount of praseodymium, samarium and gadolinium sulfate or chloride.

Epsom salts (magnesium sulfate) may also be used as one of the reagents.

Othe reagents may be used to impart hydrogen cations to the catalyst. I may use ammonium sulfate to add ammonium cations, which in turn give hydrogen cations when the clay catalyst is heated.

The mixed water slurry, composed of the based exchanged silicated clay and the aluminated sulfuric acid treated clay, is thoroughly mixed and then spray dried or pelleted by the techniques described in my aforesaid Patent 2,935,463.

The following is given for purposes of illustration only, and not as a limitation of my invention.

EXAMPLE 1

The acid activated halloysite clay (similar to that produced in Example 2 of my Patent 2,935,463, and herein referred to as Component A), in an amount equal to 36 parts by weight on a volatile free basis, is mixed with 376 parts by weight of water, 69 parts by weight of 50% (NaOH) caustic soda, and 22 parts by weight of a sodium silicate solution containing 37% by weight of sodium silicate. The sodium silicate solution contains about 28.5% by weight of $SiO_2$ and 8.5% by weight of $Na_2O$. The silica content of the acid-treated clay includes and silica soluble in sodium carbonate solution.

The mixture is maintained at temperatures of 70° to 85° F. up to a maximum of 175° F. for a period of about 52 hours. This slurry is washed and settled in a tank. The last portion of the wash water still have a pH of about 11. A typical analysis of the product, in percent by weight on a volatile free basis, follows:

|  | Percent |
|---|---|
| $SiO_2$ | 50.3 |
| $Al_2O_3$ | 34.3 |
| $Na_2O$ | 13.3 |
| $Fe_2O_3$ | .35 |

Due to variations in the composition of the natural clay being processed, and to the normal variations in commercial sulfuric acid treatment of the clay and in the procedure for the silication of the clay, the composition of Component A and the caustic soda treated clay may vary somewhat from the above analysis. The desired maximum of $Na_2O$ in the silicated clay is about 15%, and an average of about 12% is usually obtained. Thus, the $Na_2O$ content may vary between about 10% and 15% (all percentages being expressed on a volatile free basis).

The washed silicated clay slurry is put into a tank, to which is added to solution containing 34 parts by weight of Epsom salts ($MgSO_4 \cdot 7H_2O$), to cause the Mg ion base exchange. The Mg ion base exchange leaves the $Al_2O_3$ and $SiO_2$ contents of the silicated clay unchanged. The $Na_2O$ content is reduced to 5% to 10%, with a preferred range of 8.5% to 9%. (All percentages are percent by weight on a volatile free basis.) The magnesium content, expressed as MgO, will vary from about 8% to about 1% by weight of the clay, on a volatile free basis.

The resultant exchanged slurry is then filtered, and the filter cake is dispersed in 320 parts of water and mixed with 150 parts by weight of a rare earth sulfate solution containing rare earth sulfates calculated as 3.7% by weight of the rare earth oxide. The mixture has a pH of about 5.

The sulfates have the following approximate composition on a volatile free basis and expressed as percent by weight of rare earth oxides:

|  | Percent |
|---|---|
| Cerium oxide | 56 |
| Lanthanum oxide | 28.6 |
| Praseodymium oxide | 4.1 |
| Neodymium oxide | 10.5 |

Samarium and gadolinium oxides, each under 1%, are also present.

The degree of base exchange of the rare earth cations is indicated below. The base exchanged clay contains about 10% to about 12%, with an average value of about 11%, by weight of rare earth cations, expressed as oxide, on a volatile free basis, of the clay. The Mg content, expressed as MgO is, thus reduced to a maximum of about 4%, with an average value of about 2%. A suitable range of MgO is from about 4% to about 0.5% by weight. The Na content, expressed as $Na_2O$ is reduced into the range of from about 5% to about 2%, preferably in the range of about 4% to about 3% (all percentages by weight being expressed on a volatile free basis).

The resultant base exchanged clay is then washed and settled. The washed clay is then mixed with a solution containing about 2 parts by weight of ammonium sulfate. The resultant clay is then washed and filtered. The degree of washing desirable is an amount sufficient to reduce the $SO_3$ in the clay to a maximum of about 1% by weight on a volatile free basis.

The ammonium cation present in the washed, base exchanged clay, calculated as $NH_3$ on a volatile free basis, will range from about 0.4% to about 1% by weight, with 0.6% by weight being an average value.

After the aforesaid treatment, I obtain about 45 parts by weight on a volatile free basis of the base exchanged silicated clay. This material is herein referred to as Component B.

170 parts by weight of the above sulfuric acid treated halloysite, on a volatile free basis, containing about 15% of volatile matter, and 46 parts by weight of hydrated alumina (on a volatile free basis) are mixed with 600 parts by weight of water. The hydrated alumina is produced as described in Example 1 of Patent 2,935,463. The hydrated alumina contained sulfates in amounts less than 2% $SO_3$ by weight on a volatile free basis.

The resultant aluminated sulfuric acid-treated clay is herein referred to as Component A–1. The materials are thoroughly mixed; the base exchanged silicated clay, Component B, is then added; and the entire mixture is thoroughly mixed and then spray dried, to produce 260 parts by weight on a volatile free basis of the cracking catalyst herein referred to as Product C. Instead of spray drying the aforesaid clay mixture, it may be pelleted or otherwise processed, as described in my above patent.

It is to be noted that, up to this part of the process, neither the sulfuric acid-treated clay entering the process nor any of the other components employed in the process is subjected, prior to spray drying or to pelleting, to any calcination procedure. Thus, whatever water of constitution is present in the sulfuric acid-treated halloysite is not removed by any thermal treatment. The clays, both sulfuric acid-treated clay, Component A, and the silicated clay, Component B, and the final Product C, are crystalline.

However, the crystalline Product C may be subjected to a calcination procedure, for example, at a temperature of about 900° F. to about 1500° F. or even higher. It may also be exposed to high temperatures in the hydrocarbon conversion process. The Product C will thus lose water of constitution, which does not affect its continued use as a catalyst in hydrocarbon conversion processes.

A typical analysis of the Product C catalyst of my invention is:

| | Percent |
|---|---|
| $SiO_2$ | 44.8 |
| $Al_2O_3$ | 50.9 |
| $Na_2O$ | 0.5 |
| $Fe_2O_3$ | 0.3 |
| CaO | 0.2 |
| MgO | 0.5 |
| $SO_3$ | 1.0 |
| ReO | 1.7 |
| $NH_3$ | 0.1 |
| | 100.0 |

The above is given in percent by weight on a volatile free basis. The CaO and $Fe_2O_3$ are the contaminants present in Components A and B, and ReO stands for the rare earth oxides.

All of the analyses of the various products given are to be taken as typical, and various batches will be different in the percentages of their components, due to unavoidable variations in the composition of the raw clay as mined and in the degree and nature of the treatment within the ranges of composition set forth above.

While I prefer to use as a hydrocarbon conversion catalyst a product containing the Mg, rare earth and ammonium cations as indicated above, I may use varying amounts of any one or any two of the above, or any combination of the above, or omit one or more than one of them, or use in place of, or in addition to, any one or more of the above, any one or more of the base exchanged cations as follows: nickel, silver, palladium, platinum, copper, manganese, cobalt, iron, zinc, titanium, aluminum, calcium, magnesium, tungsten, molybdenum, thorium, or the rare earth cations such as cerium, lanthanum, neodymium and prasedymium. Thus, I may omit either or both the Mg or rare earth cations or $NH_4$, or any two of them. I may omit all of them and use in place thereof, as stated above, any one or more than one of the other catalyst promoter cations listed above.

The $Na_2O$ content of the Product C may be varied as desired in accord with the degree of base exchange of any one or two or any combination of the above specified cations in Component B.

The improvement obtained by using the catalyst of my invention will appear from the following.

In the following, the products were tested by a method generally used for evaluation of hydrocarbon conversion catalysts. This test is known as the Cat A method. This method is fully described in my Patent 2,935,463, columns 5 and 6. The catalyst is steamed according to the "G" test as described in my said patent, and then it is tested by the Cat A method. An additional Cat A test is made on the catalyst after steaming at 1500° F. for a period of four hours. This test is herein referred to as the "H" steaming procedure. I refer to the Cat A results on the catalyst without steam treatment as fresh, indicated by the symbol F, and those with prior steaming at 1350° F. by the symbol G, and those at 1500° F. by the symbol H.

The criteria for the suitability of a catalyst are described in the above Patent 2,935,463. Subjecting the catalyst to steam at a temperature of 1500° F. for a period of four hours has been found to be a more desirable method to determine the activity and stability of a clay catalyst for use in catalytic cracking.

The Cat A method determines the gasoline yield as percent by volume of the hydrocarbon feed, carbon make as percent by weight of the hydrocarbon feed, gas yield as percent by weight of the hydrocarbon feed, and the gas density of the gas produced, as described in my Patent 2,935,463.

The precent conversion is determined as follows:

$$1.00 - \frac{\text{Weight of bottoms}}{\text{Weight of oil charged}} \times 100$$

Bottoms are the residual oil obtained after distillation of the fraction specified as gasoline in the above Cat A test.

Comparative results with sulfuric acid treated clay, such as Component A, separately, with the aluminated sulfuric acid treated clay, such as Component A-1, separately (the clay catalyst described in my Patent 2,935,463), the silicated clay which has been base exchanged, such as Component B, separately, and the product produced by combining all the above, i.e., a product such as Product C, indicate:

(1) That the mixture of Component A-1 and Component B is markedly superior to either Component A-1 or Component B. There is a synergistic effect as a result of the mixture. The synergistic effects on the catalytic properties of Product C result from the interaction of its several components.

(2) Component B is a very active cracking catalyst of very poor stability. However, when combined with Component A-1 in proper proportions to form Product C, Product C becomes a most useful catalyst, possessing exceptional activity and stability. It produces high gasoline yields and a minimum of light gas and carbon. The improvement in the desirable properties of Product C, as measured by the Cat A test after H steaming, increases as Component B is increased to within the range of from 10% to 30% by weight of Component B on a volatile free basis.

The above conclusions follow from the tables given below:

Table 1 gives the Cat A results for sulfuric acid treated clay similar to Component A; aluminated sulfuric acid treated clay similar to Component A-1; and the base exchanged silicated clay similar to Component B; and the catalyst similar to Product C. percent conversion, each after G steaming and after H

TABLE I

| Sample | Percent Gasoline | | | Percent Gas | | | Percent Coke | | | Gas Density | | | Percent Conversion | | |
|---|---|---|---|---|---|---|---|---|---|---|---|---|---|---|---|
| | F | G | H | F | G | H | F | G | H | F | G | H | F | G | H |
| 1 | 33.7 | 27.6 | ---- | 10.7 | 5.8 | ---- | 4.82 | 2.66 | ---- | 1.17 | 0.93 | ---- | 45.3 | 33.7 | ---- |
| 2 | 40 | 35 | 36.2 | ---- | 5.3 | 5.5 | ---- | 2.6 | 2.6 | ---- | 1.20 | 1.16 | 42 | 39.5 | 40.3 |
| 3 | 42.5 | 42.1 | 10.2 | 37.7 | 3.6 | 1.3 | 12.7 | 6.1 | 0.91 | 1.79 | 1.42 | 1.14 | 91.1 | 48.0 | 12.2 |
| 4 | 59.5 | 63.9 | 60.4 | 18.5 | 11.8 | 7.36 | 7.55 | 5.04 | 3.39 | 1.69 | 1.61 | 1.52 | 78.7 | 73.5 | 64.5 |

Sample 1 is Component A—Acid treated halloysite similar to Example 2, Patent 2,935,463.
Sample 2 is Component A-1, produced as in said Example 2, employing hydrated alumina of Example 2; ratio 20% hydrated alumina and 80% acid treated halloysite on a volatile free basis.
Sample 3 is Component B, made according to the aforementioned procedure Example 1 of this specification.
Sample 4 is Product C, made according to the aforementioned procedure, containing 17.5% of Component B on a volatile free basis, outlined in Example 1.

Table 2 is derived from Table 1 and shows the ratios obtained by dividing the percent gasoline yield and the steaming, for the Components A-1 and B, by the corresponding values for the Product C.

TABLE 2

| Sample | Relative Activity | | | | Stability | | | |
|---|---|---|---|---|---|---|---|---|
| | Percent Gasoline | | Percent Conversion | | Gasoline Yield, Percent | | Conversion, Percent | |
| | G | H | G | H | G/F | H/F | G/F | H/F |
| 4 | 1 | 1 | 1 | 1 | 1.04 | 1.01 | 0.94 | 0.82 |
| 3 | 0.66 | 0.17 | 0.65 | 0.188 | 0.99 | 0.24 | 0.63 | 0.13 |
| 2 | 0.55 | 0.60 | 0.53 | 0.63 | 0.87 | 0.9 | 0.94 | 0.96 |
| 1 | 0.43 | | 0.46 | | 0.74 | | 0.74 | |

The base exchanged silicated clay, Component B, Sample 3, and the aluminated sulfuric acid treated clay, Component A-1, Sample 2, both show only a fraction of the activity of the combined Product C, Sample 4, after H steaming.

Table 2 gives the ratio of the percent gasoline yield and the percent conversion obtained after G steaming, divided by that of the catalyst fresh, i.e., unsteamed (G/F), and the like ratio of the H steamed catalyst (H/F).

Product C gives a much higher yield of percent gasoline and percent conversion with excellent stability when subjected to high temperature steaming than do the components separately. There is a strong synergistic action as a result of the mixture. This phenomenon is further emphasized by the results shown in Table 3, which shows the results of subjecting the catalysts specified in the table to the Cat A test without steaming, with G steaming and with H steaming.

TABLE 3

| Sample | Percent Comp. | Percent Gasoline | | | Percent Gas | | | Percent Coke | | | Gas Density | | | Percent Conversion | | |
|---|---|---|---|---|---|---|---|---|---|---|---|---|---|---|---|---|
| | | F | G | H | F | G | H | F | G | H | F | G | H | F | G | H |
| 2 | 0 | 40 | 35 | 36.2 | | 5.3 | 5.5 | | 2.6 | 2.6 | | 1.2 | 1.16 | 42 | 39.5 | 40.3 |
| 5 | 10 | 56.4 | 56.9 | | 16.4 | 9.7 | | | 7.0 | 3.9 | | 1.53 | 1.38 | | 74.6 | 64.8 |
| 4 | 17.5 | 59.5 | 63.9 | 60.4 | 18.5 | 11.8 | 7.36 | 7.55 | 5.04 | 3.39 | 1.69 | 1.61 | 1.52 | 78.7 | 73.5 | |
| 6 | 20 | 55.5 | 64.5 | 51.8 | 23.7 | 13.7 | 6.0 | 10.7 | 5.7 | 2.5 | 1.68 | 1.67 | 1.31 | 82.9 | 76.6 | 64.5 |
| 7 | 30 | 57.4 | 64.7 | | 27.1 | 15.5 | | | 10.7 | 7.5 | | 1.66 | 1.65 | | 90.3 | 80.9 | 54.5 |
| 8 | 40 | 55.6 | 64.8 | 43.1 | 28.4 | 17.3 | 3.4 | 13.0 | 8.3 | 1.98 | 1.72 | 1.73 | 1.21 | 91.0 | 82.6 | |
| 3 | 100 | 42.5 | 42.1 | 10.2 | 37.7 | 3.6 | 1.3 | 12.7 | 6.1 | 0.91 | 1.79 | 1.42 | 1.14 | 91.1 | 48 | 44.5 12.2 |

Table 3 shows the effect of the amount of Component B in the Product C.
Sample 2 is the Sample 2 of Table 1.
Sample 3 is the Sample 3 of Table 1.
Sample 4 is the Sample 4 of Table 1, containing 17.5% (on a volatile free basis) of the Component B formed using the weight ratios of Example 1.
Sample 5 is a sample similar to Sample 4 but containing 10% (on a volatile free basis) of Component B of composition similar to Sample 4.
Sample 6 is a sample similar to Sample 5 but containing 20% of Component B, on a volatile free basis.
Sample 7 is a sample similar to Sample 5, but containing 30% of Component B (on a volatile free basis).
Sample 8 is a sample similar to Sample 5, but containing 40% of Component B (on a volatile free basis).

Table 4 shows the results of Table 3 in a manner similar to that of Table 2, except that the aluminated sulfuric acid treated clay catalyst, Sample 2, containing no Component B, is the divisor.

TABLE 4

| Sample | Percent Product B | Relative Activity | | | | Stability | | | |
|---|---|---|---|---|---|---|---|---|---|
| | | Percent Gasoline | | Percent Conversion | | Percent Gasoline | | Percent Conversion | |
| | | G | H | G | H | G/F | H/F | G/F | H/F |
| 2 | 0 | 1 | 1 | 1 | 1 | 0.88 | 0.90 | 0.94 | 0.96 |
| 5 | 10 | 1.63 | | 1.54 | | 1.0 | | 0.70 | |
| 4 | 17.5 | 1.82 | 1.67 | 1.86 | 1.6 | 1.04 | 1.01 | 0.93 | 0.82 |
| 6 | 20 | 1.84 | 1.43 | 1.94 | 1.37 | 1.16 | 0.90 | 0.92 | 0.66 |
| 7 | 30 | 1.84 | | 2.05 | | 1.12 | | 0.89 | |
| 8 | 40 | 1.85 | 1.19 | 2.08 | 1.1 | 1.17 | 0.77 | 0.91 | 0.49 |
| 3 | 100 | 1.2 | 0.28 | 1.22 | 0.30 | 0.99 | 0.25 | 0.53 | 0.13 |

These ratios as appear in Table 4 shown an optimum concentration of the Component B in the range of about 10% to 30%, with the preferred optimum in the range of about 10% to 20%, for optimum activity after H steaming.

Table 5 shows the effect of the sulfate content of Product C on the catalytic activity in the H steaming test. It will be seen that, when the sulfate content, expressed as $SO_3$ on a volatile free basis, becomes in excess of about 1.3, the activity, expressed as percent gasoline or percent conversion, is markedly reduced. It will also appear that, as the $SO_3$ content is reduced, the activity is increased.

TABLE 5.—CAT A DATA

| Sample | Percent $SO_3$ | H | | | | |
|---|---|---|---|---|---|---|
| | | Percent Gasoline | Percent Gas | Percent Coke | Gas Density | Percent Conversion |
| 9 | 1.14 | 60.6 | 8.19 | 3.53 | 1.43 | 66.1 |
| 10 | 1.26 | 56.9 | 6.52 | 2.92 | 1.45 | 60.7 |
| 11 | 1.32 | 56.2 | 6.10 | 2.68 | 1.43 | 58.5 |
| 12 | 1.57 | 32.9 | 3.88 | 1.97 | 1.12 | 35.3 |
| 13 | 1.63 | 32.8 | 2.69 | 2.00 | 1.10 | 35.4 |

Table 6 gives the results obtained by adding Product C to circulating catalyst of the Component A-1 type in a commercial fluid cracking unit. The table shows that incremental amounts of Product C were added. Thus, the catalyst composition was successively 100% A-1; 97% A-1 and 3% C; 92% A-1 and 8% C; 87% A-1 and 13% C; 75% A-1 and 25% C; 65% A-1 and 35% C.

The source of $SO_3$ in the final catalyst may be:
(a) Sulfur-bearing mineral impurities in the raw clay employed in producing the acid-treated clay, such as alunite and pyrite, which should be at a minimum and preferably completely excluded;
(b) The sulfate present in the exchanged silicated clay; and
(c) The sulfate in the hydrated alumina.

The content of the sulfate in the Product C may be controlled by the degree of washing of the acid-treated clay in its production, by the degree of washing of the hydrated alumina, and by the degree of washing of the exchanged silicated clay in its production.

By performing the tests of Table 5 on the Product C at the various levels of $SO_3$ content, an optimum percentage of $SO_3$ may be determined for each composition employed. This optimum may vary due to the materials and operating conditions. The range of the optima of $SO_3$ content may vary from about 0.5% up to about 2% $SO_3$ based on the Product C (the combined catalyst) on a volatile free basis. The preferred range is from about 1% to about 1.4% of the combined catalyst on a volatile free basis.

ferred embodiment, employing the finely ground, calcined, acid-treated clay:

TABLE 6

| | Catalyst Composition | | | | | |
|---|---|---|---|---|---|---|
| | 100% A-1 | 97% A-1, 3% C | 92% A-1, 8% C | 87% A-1, 13% C | 75% A-1, 25% C | 65% A-1, 35% C |
| Fluid Cracker Data: | | | | | | |
| Vol. percent C₄ Free Gasoline | 51 | 54.5 | 57 | | | 61 |
| Vol. percent Conversion | 76 | 78 | | 84 | | 82 |
| Coke, Wt. percent | 2.5 | 2.45 | 1.95 | | | 2.1 |
| Reactor Bed Temp., °F | 920 | 920 | 920 | 920 | | 900 |
| CAT A DATA: | | | | | | |
| Vol. percent Gasoline | 32.0 | 35.1 | 41.6 | 45.9 | 50.1 | 54.7 |
| Wt. percent Gas | 4.36 | 4.02 | 4.40 | 6.18 | 5.48 | 6.01 |
| Wt. percent Carbon | 2.12 | 2.27 | 2.24 | 2.61 | 2.58 | 2.60 |
| Gas Density | 1.26 | 1.32 | 1.41 | 1.41 | 1.38 | 1.46 |
| Conversion, Wt. percent | 35.2 | 38.5 | 44.3 | 50.2 | 52.6 | 59.5 |

In a period of 42 days, portions of the above Product C were added to the circulating catalyst, and samples of the equilibrium catalyst taken from the fluid cracking unit were tested by the Cat A method. Yields of the products produced by the fluid cracking unit were also obtained.

The Product C used in this commercial operation had an $Al_2O_3:SiO_2$ ratio of 1:1.5 and contained the following:

| | Percent |
|---|---|
| ReO | 2.18 |
| $NH_3$ | 0.14 |
| $SO_3$ | 0.97 |
| MgO | 0.26 |

All percentages are by weight on a volatile free basis.

The addition to the catalyst A-1 of Product C materially improved the performance of the circulating catalyst. Thus, the yield of butane-free gasoline and the percent conversion, as obtained in the commercial unit, were substantially increased as the Product C was added to the catalyst A-1, notwithstanding the substantial reduction in the reactor bed temperature. Had the temperature been maintained, the improvement would have been more marked. These data confirm the results of the Cat A test on the samples of the circulating catalyst taken from the unit over the period during which Product C was added to the commercial fluid cracking unit.

EXAMPLE 2

The acid activated clay of Example 1, in finely divided form, is mixed with water and extruded into pellets of about 3/16" diameter. They are dried and calcined at 1100° F. for 12–15 hours. The temperature and duration of heating are sufficient to destroy the crystalline structure of the acid-treated clay, as is evidenced by the absence of halloysite peaks in the X-ray diffraction pattern of the calcined clay.

The calcined pellets are ground to a fine particle size of about 90% through a 325-mesh screen. The preformed, pelleted clay thus loses its geometric identity. The finely ground, calcined, acid-treated clay is mixed with caustic soda solution and sodium silicate solution. The sodium content of the solution is adjusted without increase in the pH value of the solution by the addition of a substantially non-hydrolyzable sodium salt, such as sodium chloride.

This solution is mixed with the finely ground, calcined, acid-treated clay. A rise in temperature due to hydration of the finely ground, calcined, acid-treated clay occurs. In order to adjust the temperature, crushed ice is added or other forms of refrigeration are employed to maintain the temperature within the limits previously stated for the low temperature digestion period. Where ice is added, it forms part of the water content of the reaction mixture.

As a specific example to illustrate my invention, but not as a limitation thereof, the following recipe for the composition of the treating solution illustrates a preferred embodiment, employing the finely ground, calcined, acid-treated clay:

| | Parts by weight |
|---|---|
| Water | 333.25 |
| Crushed ice | 115 |
| Sodium hydroxide solution containing 50 wt. percent NaOH | 136 |
| Sodium silicate solution containing 28.5 wt. percent $SiO_2$ and 8.5 wt. percent $Na_2O$ | 387.7 |
| Salt (NaCl) | 74.0 |

The above ingredients are combined, and then the clay in quantity as shown below is added to the mixed solution.

Finely ground, calcined, acid-treated clay, on a volatile free basis, 100.0 parts by weight.

The temperature attained upon completion of the clay-solution mixture is in the neighborhood of 60°–80° F. The mixture is maintained for about 75 to 125 hours. The temperature is then raised by direct steam injection to 180°–200° F. and maintained at said temperature for a period of about 24 to 36 hours. At the end of the elevated temperature digestion, the silicated clay is washed substantially free of water solubles.

The resultant silicated clay will have a typical analysis on a volatile free basis of:

| | Percent |
|---|---|
| $Na_2O$ | 15.9 |
| $SiO_2$ | 57.3 |
| $Al_2O_3$ | 26.5 |
| $Fe_2O_3$ | 0.3 |

The washed, silicated clay is exchanged with magnesium sulfate and rare earth sulfate solutions, as described in Example 1. A typical analysis of the resultant ion exchanged, silicated clay, on a volatile free basis, is as follows:

| | Percent |
|---|---|
| $Na_2O$ | 4.56 |
| $SiO_2$ | 55.2 |
| $Al_2O_3$ | 23.7 |
| MgO | 4.90 |
| ReO | 10.8 |
| $Fe_2O_3$ | 0.3 |

The exchanged, silicated clay is mixed with the acid-treated clay and hydrated alumina in the manner described in Example 1. A typical analysis of the catalyst, on a volatile free basis, is as follows:

| | Percent |
|---|---|
| $Na_2O$ | 0.83 |
| $SiO_2$ | 45.3 |
| $Al_2O_3$ | 49.1 |
| $Fe_2O_3$ | .32 |
| CaO | .17 |
| MgO | .57 |
| $SO_3$ | 1.43 |
| ReO | 1.90 |

The following test results, employing the Cat A method previously referred to, on samples subjected to F treatment, G treatment and H treatment, referred to in Example 1, were obtained:

above listed promoter cations, unless the promoter cations are specified in the claims.

TABLE 7

| Sample | Percent Gasoline | | | Percent Gas | | | Percent Coke | | | Gas Density | | | Percent Conversion | | |
|---|---|---|---|---|---|---|---|---|---|---|---|---|---|---|---|
| | F | G | H | F | G | H | F | G | H | F | G | H | F | G | H |
| 1 | 33.7 | 27.6 | ---- | 10.7 | 5.8 | ---- | 4.82 | 2.66 | ---- | 1.17 | 0.93 | ---- | 45.3 | 33.7 | ---- |
| 2 | 37.0 | 32.5 | 30.0 | 11.6 | 4.8 | 3.7 | 4.43 | 3.06 | 2.58 | 1.50 | 1.28 | 1.11 | 49.1 | 37.2 | 33.7 |
| 3 | 59.8 | 20.0 | 7.5 | 29.3 | 1.23 | 0.8 | 8.22 | 3.03 | 0.65 | 1.78 | 1.34 | ---- | 93.5 | 24.2 | 9.1 |
| 4 | 57.2 | 65.5 | 52.1 | 22.4 | 11.7 | 7.3 | 6.81 | 5.79 | 3.28 | 1.72 | 1.58 | 1.52 | 82.5 | 74.6 | 56.7 |

Sample 1 is Sample 1 of Table 1.
Sample 2 is another sample produced as in Example 2 of U.S. Patent 2,935,463, employing hydrated alumina (20 parts) and 80 parts of acid-treated Halloysite, all weights on a volatile free basis.
Sample 3 is the exchanged silicated clay prepared as in Example 2 above.
Sample 4 is the mixed catalyst of Example 2 above.

It will be seen that, as was the case illustrated in Table 1 for the materials of Example 1, a synergistic action is a result of the mixture of the exchanged, silicated clay and the uncalcined acid-treated clay and the hydrated alumina. The conversion for the combined catalyst after G and H treatments is substantially higher than that produced by the separate components, indicating the marked improvement in steam stability resulting from the combination. This result is confirmed by the yields of gasoline from the materials after the G and H treatments.

This data indicates, as does the data in Table 1, that the exchanged, silicated clay is, by itself, an inferior catalyst, and acts by a promoting action on the aluminated, acid-treated clay.

The hydrocarbon conversion catalyst of my invention (Product C) contains the sulfuric acid-treated clay, which in turn has been silicated (Component B) from about 5% to about 80%; and hydrated alumina, expressed as $Al_2O_3$, from about 5% to about 80%; together with the acid-treated clay (Component A), from about 10% to about 80%. All percentages are by weight based on the catalyst, on a volatile free basis.

When the hydrocarbon conversion catalyst is used as a hydrocarbon cracking catalyst, it may contain the sulfuric acid-treated clay, which in turn has been silicated (Component B), from about 5% to about 30%; hydrated alumina, expressed at $Al_2O_3$, from about 5% to about 35%; together with the acid-treated clay (Component A), from about 50% to about 82%; all percents by weight based on the catalyst, on a volatile free basis.

The preferred content of the silicated clay, when made from uncalcined clay as above, may be in the range of from about 10% to about 30% by weight of the finished catalyst, with a content of about 12% to about 25% being preferred. When made from calcined clay as above, the preferred range is from about 5% to about 20%. All percentages are on volatile free basis.

The hydrocarbon conversion catalyst of my invention, such as Product C, contains as components the sulfuric acid treated clay, such as Component A, the hydrated alumina, referred to above, and silicated clay, such as Component B, expressed in percent by weight of the catalyst, on a volatile free basis, as follows.

Sulfuric acid-treated clay: from about 50% to about 82%.

Hydrated alumina, expressed at $Al_2O_3$: from about 6% to about 26%.

Silicated clay: from about 10% to about 30%.

Sodium content of the catalyst, expressed as $Na_2O$: from about 0.2% to about 1.5%.

It is to be understood that each of the components may vary in composition, as described above, or as described in the Ewing patent and in my patent referred to above.

The catalyst also preferably contains one or more than one of the promoter cations listed above. The term catalyst promoter cations, when used in the claims, is understood to be a generic term including all of the above listed promoter cations, unless the promoter cations are specified in the claims.

The promoter cations may be introduced as salts or hydrated salts or hydroxides. Preferably they are in base exchange position.

Presently, I prefer to employ one or more than one or all of the catalyst promoter cations used in Example 1.

The catalyst may contain the catalyst promoter cations Mg, ReO, and $NH_4$, as in Example 1. The catalyst produced from the uncalcined clay and from the calcined clay may contain promoter cations in the following ranges, when expressed as follows and on a volatile free basis.

Magnesium, expressed as MgO: from 0% to about 1.2%.

Rare earth cations, expressed as rare earth oxides, ReO: from 0% to about 3.6%.

$NH_4$, expressed as $NH_3$: from 0% to about 0.3%.

The sodium content of the catalyst containing Components A and B, expressed at $Na_2O$, is from about 0.2% to about 1.5% by weight based on the combined catalyst on a volatile free basis.

When I use any of the above catalyst promoter cations, I prefer to use them in at least the following amounts, expressed as follows and in weight percent of the catalyst on a volatile free basis:

```
                                                  Percent
Magnesium, expressed at MgO _____ 0.05
Rare earth cations, expressed as rare earth oxides,
  ReO _____ 1.0
NH₄, expressed as NH₃ (if employed) _____ 0.04
```

A preferred range of components of the hydrocarbon conversion catalyst of my invention is as follows, in weight percent of the catalyst on a volatile free basis, with the components and cations expressed as above.

Sulfuric acid treated clay: from about 59% to about 81%.

Hydrated alumina, expressed as $Al_2O_3$: from about 8% to about 24%.

Silicated clay: from about 10% to about 20%.

Sodium, expressed as $Na_2O$: from about 0.3% to about 0.8%.

Mg, expressed as MgO: from about 0.05% to about 0.8%.

Rare earth cations, expressed as rare earth oxides, ReO: from about 1.1% to about 2.4%.

$NH_4$, expressed as $NH_3$: from 0% to about 0.2%.

Sulfates, expressed as $SO_3$: up to within the range of about 1.4% to about 1.5%.

The catalyst of my invention will find utility in any of the above processes of conversion of hydrocarbons in which catalysts have been employed. The use of the catalyst of my invention will give improved results when considered by the usual standards for evaluation of catalysts in such processes. Depending on the nature of the process of conversion, the temperatures of contact between the catalyst and the hydrocarbons may vary from ambient temperature up to 1400° F.

For vapor phase cracking of gas oils, the temperature may vary from about 450° F. to about 950° F.

Dehydrogenation reactions may be carried out at from about 300° F. to about 1025° F.

Desulfurication reactions may be carried out at temperatures from about 600° F. to about 1000° F.

Hydrogenation reactions may require temperatures up to 1000° F. under pressures ranging from ambient up to 3000 pounds per square inch gage.

Hydrocracking may employ temperatures from about 400° F. to about 825° F. and pressure up to about 2500 pounds per square inch gage.

Alkylation reactions may be carried out at temperatures between 15° F. to about 850° F., at pressures from ambient to 1000 pounds per square inch gage.

Aromatization may be carried out at temperatures between 350° F. and 1100° F.

Additional materials such as, for example, other catalysts, may be mixed with the catalyst of my invention to modify or add to the properties of my invention.

While I have described particular embodiments of my invention for the purpose of illustration, it should be understood that various modifications and adaptations thereof may be made within the spirit of the invention, as set forth in the appended claims.

I claim:
1. A hydrocarbon conversion catalyst consisting essentially of from about 5% to about 80% by weight of silicated kaolin clay, from about 5% to about 80% by weight of hydrated alumina, expressed as $Al_2O_3$, and from about 10% to about 90% by weight of sulfuric acid treated clay, based on the catalyst, all on a volatile free basis.

2. A hydrocarbon conversion catalyst consisting essentially of a silicated halloysite clay, from about 5% to about 30% by weight of the catalyst; hydrated alumina in amounts, expressed as $Al_2O_3$, from about 5% to about 35% by weight of the catalyst; and sulfuric acid treated kaolin clay, from about 50% to about 82% by weight of the catalyst; all on a volatile free basis.

3. The hydrocarbon conversion catalyst of claim 2, in which the percentage amounts of the silicated clay in the hydrocarbon conversion catalyst is in the range of about 10% to about 30% by weight; and the hydrated alumina, expressed as $Al_2O_3$, is in the range of about 6% to about 26% by weight of the hydrocarbon conversion catalyst; and the sulfuric acid treated clay is in the range of about 50% to about 82% by weight of the hydrocarbon conversion catalyst.

4. The hydrocarbon conversion catalyst of claim 2, in which the percentage amounts of the silicated clay in the hydrocarbon conversion catalyst is in the range of about 10% to about 20% by weight; the hydrated alumina, expressed as $Al_2O_3$, is in the range of about 8% to about 24% by weight of the hydrocarbon conversion catalyst; and the sulfuric acid treated clay is in the range of about 59% to about 81% by weight of the hydrocarbon conversion catalyst.

5. The hydrocarbon conversion catalyst of claim 2, in which the silicated clay has an $Al_2O_3$ to $SiO_2$ ratio, on a volatile free basis, in excess of 1:2.

6. The hydrocarbon conversion catalyst of claim 2, in which the silicated clay has an $Al_2O_3$ to $SiO_2$ ratio, on a volatile free basis, of from about 1:2 to about 1:6.

7. The hydrocarbon conversion catalyst of claim 2, containing about 2.0% to about 5% by weight of sodium, expressed as $Na_2O$, based upon the silicated clay component as 100%, on a volatile free basis.

8. The hydrocarbon catalyst of claim 2, containing about 0.3% to about 1.5% by weight of sodium, expressed as $Na_2O$, on a volatile free basis.

9. The hydrocarbon conversion catalyst of claim 2, containing a catalyst promoter cation.

10. The hydrocarbon conversion catalyst of claim 2, containing a cation chosen from the group consisting of magnesium, rare earth and ammonium cations.

11. The hydrocarbon conversion catalyst of claim 2, containing a catalyst promoter cation chosen from the group consisting of magnesium, rare earth cations, and ammonium cations in base exchange positions on the clay.

12. The hydrocarbon conversion catalyst of claim 2, in which the catalyst contains rare earth cations in the range of about 10% to about 12% by weight of rare earth cations, expressed as oxides of the rare earth cations, based on the silicated clay component as 100%, on a volatile free basis.

13. The hydrocarbon conversion catalyst of claim 2, in which the said catalyst contains rare earth cations, expressed as rare earth oxides, from about 1.1% to about 2.4% by weight, on a volatile free basis, said rare earth cations being in exchange position on the clay catalyst.

14. The hydrocarbon conversion catalyst of claim 2, in which the silicated clay component contains from about 0.5% to about 4% by weight of magnesium, expressed as MgO, based on the silicated clay component as 100%, all on a volatile free basis.

15. The hydrocarbon conversion catalyst of claim 2, in which said catalyst contains from about 0.05% to about 1.2% by weight of magnesium expressed as magnesium oxide, on a volatile free basis, said magnesium being in exchange position on the clay catalyst.

16. The hydrocarbon conversion catalyst of claim 2, containing $NH_4$ cation, expressed as $NH_3$, in the range of about 0.4% to about 1% by weight based on the silicated clay component of said clay as 100%, all on a volatile free basis.

17. The hydrocarbon conversion catalyst of claim 2, in which the said catalyst contains $NH_4$, expressed as $NH_3$, from about 0.04% to about 0.3% by weight of the catalyst, on a volatile free basis.

18. The hydrocarbon conversion catalyst of claim 2, containing from 0% to about 1.3% by weight of $SO_3$, on a volatile free basis.

19. The hydrocarbon conversion catalyst of claim 4, in which the silicated clay has an $Al_2O_3:SiO_2$ ratio, on a volatile free basis, of from about 1:2.2 to about 1:6, and said catalyst contains Na, expressed as $Na_2O$, from about 0.3% to about 0.8%; rare earth cations, expressed as oxides, from about 1.1% to about 2.4%; magnesium, expressed as MgO from about 0.05% to about 0.8%; $NH_4$, expressed as $NH_3$, from about 0.04% to about 0.2%; and sulfates, expressed as $SO_3$, less than 1.3%; all percentages by weight on a volatile free basis.

20. A process for forming a hydrocarbon conversion catalyst which comprises mixing a sulfuric acid treated kaolin clay with a high pH solution containing silicate ions and Na, for a time and at an elevated temperature to silicate the clay to decrease the $Al_2O_3:SiO_2$ ratio of said clay to an $Al_2O_3:SiO_2$ ratio in the range of about 1:2.2 to about 1:6; washing the said silicated clay to remove excess dissolved compounds; base exchanging said silicated clay with promoter cations; and mixing, in the presence of water, from about 5% to about 80% of the aforesaid washed silicated clay with from about 10% to about 90% of acid-treated kaolin clay and from about 5% to about 80% of hydrated alumina, expressed as $Al_2O_3$; all percentages by weight based on the combined weights of the foregoing, all on a volatile free basis; and removing water from the mixed clays and hydrated alumina.

21. The process of claim 20, in which said high pH solution contains sodium expressed as $Na_2O$ and Si expressed as $SiO_2$ in the molar ratio of $Na_2O:SiO_2$ in the range of 0.75 mol of $Na_2O:.1$ mol of $SiO_2$ to 7.5 mols of $Na_2O:1.0$ mol of $SiO_2$.

22. The process of claim 20, in which said high pH solution contains sodium expressed as $Na_2O$ and Si expressed as $SiO_2$ in the molar ratio of $Na_2O$ to $SiO_2$ in the range of 35 mols of $Na_2O:1$ mol $SiO_2$.

23. The process of claim 20, in which said high pH solution contains Na expressed as $Na_2O$ and Si expressed as $SiO_2$ in the molar ratio of $Na_2O:SiO_2$ in the range of 0.75 mol Na₂O:1 mol SiO₂ to 1.5 mol Na₂O:1 mol SiO₂.

24. The process of claim 20, base exchanging the silicated clay with a magnesium salt solution and adding Mg to the said silicated clay in amount, expressed as MgO, in the range of about 0.5% to about 4% by weight of the exchanged silicated clay on a volatile free basis.

25. The process of claim 20, base exchanging the said silicated clay prior to mixing with a soluble salt of rare earth cations.

26. The process of claim 20, base exchanging said silicated clay, prior to mixing with a soluble salt of rare earth cations, and adding rare earth cations, expressed as oxides, from about 10% to about 12% by weight of the rare earth oxides, based on the exchanged silicated clay, on a volatile free basis.

27. The process of claim 26, in which said high pH solution contains sodium silicate, the molar ratio of Na₂O to SiO₂ being in excess 1 mol of Na₂O to 1 mol of SiO₂.

28. The process of claim 20, exchanging said silicated clay with a solution of an ammonium salt.

29. The process of claim 20, exchanging said silicated clay with an ammonium salt solution and adding NH₄ cations in amount, expressed as NH₃, within the range of about 0.4% to about 1% by weight of the exchanged silicated clay, on a volatile free basis.

30. The process of claim 29, in which said high pH solution contains sodium silicate, the molar ratio of Na₂O to SiO₂ being in excess of 1 mol of Na₂O to 1 mol of SiO₂.

31. The process of claim 20, said washing of said silicated clay and said mixed clays reducing the sodium content of said mixed clay, expressed as Na₂O, within the range of about 0.2% to about 1.5% of the mixed clays and hydrated alumina, all percents by weight on a volatile free basis.

32. The process of claim 20, in which said high pH solution contains sodium silicate, the molar ratio of Na₂O to SiO₂ being in excess of 1 mol of Na₂O to 1 mol of SiO₂.

33. The process of claim 20, exchanging said silicated clay prior to mixing with a magnesium salt solution, and adding to said silicated clay Mg in amounts, expressed as MgO, within the range of from about 8% to 1% by weight, on a volatile free basis; exchanging said magnesium silicated clay with a rare earth salt solution, and adding rare earth cations, expressed as oxides, within the range of from about 10% to about 12% by weight, on a volatile free basis, exchanging said exchanged clay with ammonium salt solution in amount sufficient to add NH₄ cations, expressed as NH₃, within the range of about 0.4% to 1% by weight, on a volatile free basis; said base exchange and said washing of the clay reducing the sodium content, expressed as Na₂O, to within the range of from about 2% to 5% by weight, and reducing the sulfate content to less than 1.3% by weight of SO₃ by weight, on a volatile free basis.

34. The process of conversion of hydrocarbons which comprises contacting said hydrocarbons at a conversion temperature with a catalyst consisting essentially of a mixture of sulfuric acid treated kaolin clay, a silicated kaolin clay, and hydrated alumina, said mixture containing said hydrated alumina and said silicated kaolin clay in amounts each less than one-third by weight of said catalyst, and said acid treated clay being of weight percent greater than said silicated clay and also greater than the weight percent of said hydrated alumina, all on a volatile free basis.

35. The process of claim 34, in which said catalyst contains a catalyst promoter chosen from the group consisting of magnesium, rare earth and ammonium cations.

36. The process of claim 34, in which the catalyst contains from about 0.2% to about 1.5% by weight of Na, expressed as Na₂O, from about 1% to about 3.6% by weight of rare earth cations expressed as rare earth oxides, and from about 0.05% to about 1.2% by weight of Mg, expressed as MgO, and from about 0.04% to about 0.3% by weight of NH₄, expressed as NH₃, and less than 1.3% by weight of SO₃, all percentages on a volatile free basis.

37. A hydrocarbon conversion catalyst consisting essentially of a minor proportion by weight of silicated clay, a minor proportion by weight of hydrated alumina, and a major proportion by weight of sulfuric acid treated clay.

38. The process of conversion of hydrocarbons which comprises contacting said hydrocarbons at a conversion temperature with a catalyst consisting essentially of a mixture of sulfuric acid treated kaolin clay, a silicated calcined kaolin clay substantially free of crystalline kaolin component, and hydrated alumina, said mixture containing said hydrated alumina and said silicated kaolin clay in amounts each less than one-third by weight of said catalyst, and said acid treated clay being of weight percent greater than said silicated clay and also greater than the weight percent of said hydrated alumina, all on a volatile free basis.

39. The process of claim 38, in which said catalyst contains from about 0.2% to about 1.5% by weight of sodium, expressed as Na₂O, on a volatile free basis.

40. The process of claim 38, in which said catalyst contains a catalyst promoter chosen from the group consisting of magnesium, rare earth and ammonium cations.

41. The process of claim 38, in which the catalyst contains from about 0.2% to about 1.5% by weight of Na, expressed as Na₂O, from about 1% to about 3.6% by weight of rare earth cations expressed as rare earth oxides, and from about 0.05% to about 1.2% by weight of Mg, expressed as MgO, and from about 0.04% to about 0.3% by weight of NH₄, expressed as NH₃, and less than 1.3% by weight of SO₃, all percentages on a volatile free basis.

42. The composition of claim 37, in which said kaolin is halloysite.

43. A cracking catalyst composition for conversion of hydrocarbons, consisting essentially of a silicated calcined acid-treated kaolin clay, substantially free of crystalline kaolin component and containing sodium expressed as Na₂O in amount less than about 5% of said silicated clay, on a volatile free basis, and containing also exchange cations chosen from the group consisting of magnesium, calcium, cerium, lanthanum, praseodymium, neodymium and ammonium.

44. The composition of claim 43, in which the kaolin is halloysite.

45. A catalytic composition of matter for conversion of hydrocarbons, consisting essentially of a silicated acid-treated kaolin clay, substantially free of crystalline kaolin component, containing sodium expressed as Na₂O in amount from about 2% to about 5% of said composition, magnesium cations expressed as MgO in amount from less than about 4% to about 0.5% by weight, and rare earth cations expressed as oxide in the range of about 10% to about 12%, all percentages by weight of the composition on a volatile free basis.

46. The composition of claim 45, in which the kaolin is halloysite.

47. A composition of matter according to claim 43, containing also ammonium cation, calculated as NH₃, ranging from about 0.4% to about 1% by weight on a volatile free basis.

48. The composition of claim 47, in which the kaolin is halloysite.

49. A catalytic composition of matter for conversion of petroleum hydrocarbons, consisting essentially of a silicated, calcined, acid-treated kaolin clay, substantially free of crystalline kaolin component and containing sodium in amount calculated as Na₂O from about 10% to about 15% of the silicated clay, on a volatile free basis, the sodium content of said clay being exchangeable with cations chosen from the group consisting of magnesium, calcium, cerium and lanthanum.

50. The composition of claim 49, in which said kaolin is halloysite.

51. A cracking catalyst composition for conversion of hydrocarbons, consisting essentially of a silicated, calcined, acid-treated kaolin clay, substantially free of crystalline kaolin component and containing sodium in amount expressed as $Na_2O$ less than about 5% of said silicated clay, on a volatile free basis, and containing also exchange cations chosen from the group consisting of magnesium, calcium, cerium, lanthanum, praseodymium, neodymium and ammonium.

52. The composition of claim 51, in which the kaolin is halloysite.

53. A catalytic composition of matter for conversion of hydrocarbons, consisting essentially of a silicated, acid-treated, kaolin clay, substantially free of crystalline kaolin component, containing sodium expressed as $Na_2O$ in amount from about 2% to about 5% of said composition, magnesium cations expressed as MgO in amount from less than about 4% to about 0.5% by weight, and rare earth cations expressed as oxide in the range of about 10% to about 12%, all percentages by weight of the composition on a volatile free basis.

54. The composition of claim 53, in which the kaolin is halloysite.

55. A composition of matter according to claim 51, containing also ammonium cation, calculated as $NH_3$, ranging from about 0.4% to about 1% by weight on a volatile free basis.

56. The composition of claim 55, in which the kaolin is halloysite.

57. A process for forming a hydrocarbon conversion catalyst precursor which comprises mixing a calcined, acid-treated, kaolin clay, substantially free of crystalline kaolin component, with a high pH solution containing Na and silicate ions, the molar ratio of $Na_2O$ and $SiO_2$ in the solution being in the range of 0.75 $Na_2O$:1 $SiO_2$ to 1.5 $Na_2O$:1 $SiO_2$; maintaining the mixture of acid-treated clay at a temperature of about 65° F. to about 85° F. for from 50 to 200 hours and then increasing the temperature to the range of from 175° F. to about 210° F., and maintaining the same for a time sufficient to produce a silicated clay product having an $Al_2O_3$ to $SiO_2$ ratio of from about 1:3 to about 1:4.5, and containing from about 10% to about 15% of $Na_2O$ on a volatile free basis.

58. The process of claim 57, in which the acid-treated kaolin is an acid-treated halloysite.

References Cited

UNITED STATES PATENTS

| 3,140,253 | 7/1964 | Plank et al. | 208—120 |
| 2,544,695 | 3/1951 | Kumins | 106—305 |

DELBERT E. GANTZ, *Primary Examiner.*

G. E. SCHMITKONS, *Assistant Examiner.*

U.S. Cl. X.R.

252—455

PO-1050
(5/69)

UNITED STATES PATENT OFFICE
CERTIFICATE OF CORRECTION

Patent No. 3,446,727    Dated May 27, 1969

Inventor(s) Robert B. Secor

It is certified that error appears in the above-identified patent and that said Letters Patent are hereby corrected as shown below:

1) At column 5, line 18, "Othe" is changed to read --Other--, as correctly shown at page 10, line 18 of the specification.

2) At column 5, line 65, the word "to" is changed to read --a--, as correctly shown at page 12, line 4 of the specification.

3) At column 6, line 20, the words "MgO is" are changed to read --MgO, is-- as correctly shown at page 13, line 3 of the specification.

4) At Column 8, line 51, the words "percent conversion, each after G steaming and after H" are deleted to correspond with page 18, line 13, of the specification; line 75 is changed by adding the words --percent conversion, each after G steaming and after H-- after "the" to correspond with lines 1 through 5 at page 20 of the specification.

5) At column 12, line 21, the symbol --(1)-- is inserted before the word "water" to correspond with line 15, page 26 of the specification; at line 22, the symbol --(2)-- is inserted before the word "Crushed" to correspond with line 16, page 26 of the specification; at line 23, the symbol --(3)-- is inserted before the word "Sodium" to correspond with line 17, page 26 of the specification; at line 25, the symbol --(4)-- is inserted before the word "Sodium" to correspond with line 19, page 26 of the specification; at line 27, the symbol --(5)-- is inserted before the word "Salt" to correspond with line 22, page 26 of the specification; at line 30, the symbol --(6)-- is inserted before the word "Finely" to correspond with line 25, page 26 of the specification.

6) At column 13, line 60, the period "." is deleted and a colon --:-- is substituted therefor to correspond

PO-1050
(5/69)

UNITED STATES PATENT OFFICE
CERTIFICATE OF CORRECTION

Patent No. 3,446,727　　　　　　　　Dated May 27, 1969

Inventor(s) Robert B. Secor

It is certified that error appears in the above-identified patent and that said Letters Patent are hereby corrected as shown below:

with line 13, page 31 of the specification;

7) At column 14, line 26, the period "." is changed to a colon --:-- to correspond with page 32, line 9 of the specification;

8) At column 18, line 52 (line 8 of Claim 45), the first occurrence of "earth" is deleted to correspond with claim 47 of the application in its amended form, as shown at page 3 of the amendment to the application dated January 10, 1968.

SIGNED AND SEALED

FEB 23 1971

(SEAL)
Attest:

Edward M. Fletcher, Jr.
Attesting Officer

WILLIAM E. SCHUYLER, JR.
Commissioner of Patents